United States Patent Office 3,483,294
Patented Dec. 9, 1969

3,483,294
1,1-DIETHYL-2-METHYL - 3 - DIPHENYLMETHYL-
ENEPYRROLIDINIUM HALIDE COMPOSITIONS
AND THERAPY
Sadao Ohki, Tokyo, and Shigenobu Kumada, Itami, Japan,
assignors to Fujisawa Pharmaceutical Co., Ltd., Higa-
shiku, Osaka, Japan, a company of Japan
No Drawing. Filed Nov. 4, 1966, Ser. No. 591,949
Int. Cl. A61k 27/00
U.S. Cl. 424—274                                7 Claims

ABSTRACT OF THE DISCLOSURE

Compositions comprising a 1,1-diethyl-2-methyl-3-di-phenylmethylenepyrrolidinium halide, such as the bromide, are effective parasympathetic ganglion blocking agents and are particularly useful in the treatment of peptic ulcers.

---

This invention relates to certain 1,1-diethyl-2-methyl-3-diphenylmethylenepyrrolidinium halide compositions and therapy. More particularly, it relates to the dosage unit compositions containing certain 1,1-diethyl-2-methyl-3-diphenylmethylenepyrrolidinium halide for administration to mammals and to methods of using said compositions in the treatment of mammals for certain conditions.

An object of this invention is to provide methods and compositions for the treatment of spasms of smooth muscle organs and peptic ulcers in mammals.

A further object is to block parasympathetic ganglia in mammals.

In accordance with this invention, 1,1-diethyl-2-methyl-3-diphenylmethylenepyrrolidinium halide, in which the halogen thereof has an atomic weight in excess of 35, has the following formula:

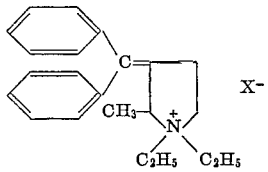

wherein X is halogen atom having an atomic weight exceeding 35. In the above formula, halogen atom means chlorine, bromine or iodine. The compounds of this formula are hereinafter referred to as "Pyrodifenium compound."

This compound may, for example, be prepared by treating 2-methyl-3-diphenylmethylene-1-pyrroline with ethyl iodide, reducing the produced 1-ethyl-2-methyl-3-diphenylmethylene-1-pyrrolinium iodide and then treating thus obtained 1-ethyl-2-methyl-3-diphenylmethylenepyrrolidine with ethyl halide in which the halogen atom has an atomic weight exceeding 35.

In the study of various types of organic compounds and their pharmacological activities, the inventors found that Pyrodifenium compound has excellent properties in comparison with the so-called synthetic antispasmodics or peptic ulcer remedies presently available, such as Scopolamine butylbromide, Benactyzine methylbromide, Propantheline bromide, Oxypyrronium bromide [1,1-dimethyl-2-(2-cyclohexyl-2-phenylglycolyloxy) methylpyrrolidinium bromide] and so forth. That is, Pyrodifenium compound has the following characteristics:

(i) It is potent in parasympathetic ganglion blocking activity which is considered to play an important role in the inhibition of spasms of smooth muscle organs in human subject clinically.

(ii) It has a strong antispasmodic action on the smooth muscle organs in mammals.

(iii) It has powerful action to inhibit gastric secretion and ulcer formation.

(iv) Side effects such as mydriasis and dryness of mouth, are scarcely recognized.

(v) Its action is short-lasting.

These characteristics will be clearly understood from the results of both pharmacological and clinical tests to be mentioned hereafter.

Comparisons between the aforementioned synthetic antispasmodics or peptic ulcer remedies and Pyrodifenium compound of this invention have evidenced that Pyrodifenium compound has relative analogy in pharmacological properties to Scopolamine butylbromide. However, Pyrodifenium compound is superior to Scopolamine butylbromide in that the former exhibits a similar effect at doses smaller than those of the latter and is lesser in side effects.

Moreover, Pyrodifenum compound can be manufactured at lower costs, being therefore commercially advantageous.

(I) PHARMACOLOGICAL TEST (1) Parasympathetic ganglion blocking action

The action to inhibit spasms induced by nicotine (stimulation of the parasympathetic ganglion) of 1,1-diethyl-2 - methyl - 3 - diphenylmethylenepyrrolidinium bromide hereinafter referred to "Pyrodifenium bromide," was studied with a guinea pig ileum. (v. Table I).

TABLE 1.—Anti-nicotine effect (guinea pig)

| Drugs | Antinicotine Activity $ED_{50}$ ($\mu$g./ml.) |
|---|---|
| Benactyzine methylbromide | 0.14 |
| Propantheline bromide | 0.09 |
| Oxypyrronium bromide | 0.33 |
| Scopolamine butylbromide | 0.65 |
| Pyrodifenium bromide | 0.07 |

Experimental method: The isolated guinea pig iluem was suspended in Tyrode's bath. Pyrodifenium bromide was added to the bath one minute before the addition of the nicotine tartarate (10 $\mu$g./ml.), and washing was effected two minutes after addition thereof.

(2) Antispasmodic actions (i) Antispasmodic action of Pyrodifenium bromide on the jejunum of dogs was found to be more potent than atropine, scopolamine, and scopolamine butylbromide as shown in Table 2.

TABLE 2.—INHIBITORY EFFECT ON THE SPONTANEOUS JEJUNAL MOTILITY (DOG)

| Drugs | Equipotency to Atr. 5 μg./kg. | Potency ratio | Duration (min.) |
|---|---|---|---|
| Atropine | 5 | 1 | 19 |
| Scopolamine | 5 | 1 | 24 |
| Scopolamine butylbromide | 10-15 | 0.3-0.5 | 8 |
| Pyrodifenium bromide | 2.5 | 2 | 7 |

Experimental method: Balloons connected to a strain gauge were placed at various positions in the gastrointestinal tract through a midline abdominal incision. In one of the series, dogs anesthetized with urethane (1 g./kg., subcutaneous) and morphine (5 mg./kg., subcutaneous) were used and the effect of Pyrodifenium bromide on the spontaneous motility of the jejunum was examined.

(ii) Besides, the antispasmodic activities on the duodenum of dogs were measured electromyographically, by which a clear anti-spasmodic action of Pyrodifenium bromide was found, though the action of Atropine and other synthetic anti-spasmodics hardly influences the record of electromyography. The results have shown that an electrical silence is observed on the electromyogram and the motility of the duodenum is entirely depressed.

Experimental method: Sixteen adult dogs, each weighing 12 kg.-26 kg., were used. The abdomen was opened under anesthesia with pentothal sodium given intravenously, and a bipolar needle electrode, 170μ in diameter and at 1.5 mm. discharge intervals, was inserted through the front walls of the serious membrane of the duodenum for electromyographic recording. Simultaneously, the motility curve of the pylorus and the duodenum was recorded by means of a 120Ω silicone gauge placed between two needles. During the course of recording, Pyrodifenium bromide, each 0.25 mg./kg., was intravenously injected to the animals.

(3) Effects on gastric secretion and ulcer formation in rats
(i) Shay rats

The average effect of Pyrodifenium bromide and atropine, to inhibit gastric secretion and to protect ulcer formation are shown in Table 3.

At doses of 0.5, 2.5 and 12.5 mg./kg., Pyrodifenium bromide inhibited gastric secretion by 37.3, 65.4 and 89.4 percent respectively, and at the same dose levels, atropine inhibited it by 42.9, 59.3 and 77.9 percent.

Pyrodifenium bromide inhibited ulcer formation at doses of 2.5 and 12.5 mg./kg.; on the other hand, atropine did not clearly decrease ulcer formation even at the largest dose of 12.5 mg./kg. (v. Table 3).

while the inhibitory percentage of Atropine was 66 percent at the same dose. (v. Table 4).

TABLE 4.—INHIBITORY EFFECT ON ULCER FORMATION (STRESS RAT)

| Drugs | Doses (mg./kg. s.c.) | No. of expt. | Area of ulceration (mm.²) | Percent inhibition |
|---|---|---|---|---|
| Control | | 10 | 36.6 | |
| Pyrodifenium bromide | 0.5 | 5 | 36.2 | 2.1 |
| | 2.5 | 5 | 25.4 | 30.6 |
| | 12.5 | 5 | 0 | 100 |
| Atropine | 0.5 | 5 | 44.8 | −27.3 |
| | 2.5 | 5 | 29.0 | 20.8 |
| | 12.5 | 5 | 12.4 | 61.6 |

Experimental method: The rats were placed in immobilization cages and then submerged in a waterbath at 22° C. The test drugs were administered subcutaneously before immobilization and sixteen hours later the animals were sacrificed and the stomach was removed. The macroscopic rating of ulcer formation was made according to a scoring system based on the number of ulcers and their severity.

(4) Acute toxicity

The results are shown in Table 5.

TABLE 5.—ACUTE TOXICITY

| | $LD_{50}$ (mg./kg.) | | |
|---|---|---|---|
| | Pyrodifenium bromide | | Pyrodifenium iodide, mice |
| Route of administration | Mice | Rats | |
| Intravenous | 12.2 | | 9.7 |
| Intraperitoneal | | 62 | |
| Subcutaneous | 79 | 170 | |
| Oral | 310 | 1,100 | |

In the table, Pyrodifenium iodide means 1,1-diethyl-2-methyl-3-diphenylmethylenepyrrolidinium iodide.

(5) Others (i) Action on the central nervous system
The action of Pyrodifenium bromide to prolong barbituate narcosis, its influences on convulsion induced by electrical stimulation and on spinal reflexes, etc. were studied with respect to experimental animals by the conventional technique, without any noticeable action of Pyrodifenium bromide being encountered.

(ii) Antibarium and antihistamin actions
The above actions of Pyrodifenum bromide on the isolated intestine of guinea pigs were studied by the Magnus method, without any inhibitory effect being noticed.

(iii) Anticholinergic action
Both protective and relaxing effects of various agents

TABLE 3.—EFFECTS ON GASTRIC SECRETION AND ULCER FORMATION (SHAY RATS)

| Drugs | Doses (mg./kg. s.c.) | Gastric secretion (8 hrs.) | | Acidity | | Ulcer formation (18 hrs.) | | |
|---|---|---|---|---|---|---|---|---|
| | | No. of expt. | Percent inhibition | Free | Total | No. of expt. | Percent inhibition | No. of deaths |
| Control | | 10 | | 76.6 | 93.0 | 10 | | 10 |
| Pyrodifenium Bromide | 0.5 | 5 | 37.3 | 74.2 | 101.8 | 5 | 5 | 4 |
| | 2.5 | 5 | 65.4 | 66.4 | 107.2 | 5 | 45 | 2 |
| | 12.5 | 5 | 89.4 | | | 5 | 75 | 0 |
| Atropine | 0.5 | 5 | 42.9 | 74.6 | 94.4 | 5 | 45 | 1 |
| | 2.5 | 5 | 59.3 | 70.6 | 87.0 | 5 | 20 | 3 |
| | 12.5 | 5 | 77.9 | 29.0 | 87.0 | 5 | 20 | 2 |

Experimental method: Shay rats were prepared according to the method described by Shay et al. Gastroenterology 5, 43 (1945). The test drugs were administered subcutaneously, immediately after operation. After eight hours, some of the animals were anesthetized with ether, the stomach was removed and the volume and acidity of gastric fluid was measured. After eighteen hours, the remaining animals were sacrificed in the same manner, and the degree of ulceration was macroscopically estimated.

(ii) Stress rats
Given subcutaneously, Pyrodifenium bromide completely inhibited the ulcer formation at a dose of 12.5 mg./kg., on acetylcholine contractions were studied by using the isolated intestinal tube of guinea pigs and by the Magnus method. The results have shown that the anticholinergic activity of Benactyzine methylbromide, Propantheline bromide, Oxypyrronium bromide, etc. were more potent than Atropine, while that of Pyrrolidinium bromide was less potent than Atropine, but stronger than Scopolamine butylbromide.

Although the explanation of pharmacological tests as mentioned above is made mainly to Pyrodifenium bromide, the result of the tests on Pyrodifenium chloride and iodide was substantially similar to that of said bromide.

(II) DOSAGE

Clinical studies of Pyrodifenium bromide were carried out on more than 2,000 human subjects for examining its optimum dosage, at varying dose levels and for various diseases, by the oral and parenteral routes of administrations.

The results have shown the optimum daily dosage for adults to be about 15–45 mg., and the optimum dosage unit to be about 5–15 mg. These dosages, however, depend on the condition, body weight, etc. of the patient, and a unit dose of about 2 mg. may also be effective. Besides, in certain cases, no noticeable side effect was seen even at a daily dose of about 90 mg.

On practical clinical uses of Pyrodifenum bromide, oral administration of the tablet (5 mg.), 1–4 times (3–9 tablets daily), may be preferable. In cases of parenteral administration, a unit dose of 1 ampoule (7.5 mg.) may be advisable and be preferably used 1–3 times a day. In rectal uses, one suppository (7.5 mg.) is inserted to the rectum, 2–5 times daily, after fecal discharge.

Furthermore, in cases of severe pain or colic, administration in properly increased doses is advisable.

(III) CLINICAL TEST

(1) Antispasmodic effect

An injectable solution of pyrodifenium bromide, 1 ml. ampoule (7.5 mg.), was given to patients with varying diseases necessitating antispasmodics subcutaneously, intramuscularly or intravenously. In patients with severe pain or colic, the dose was increased to 2 ampoules. Clinical results are as shown below (v. Table 6).

TABLE 6.—ANTISPASMODIC EFFECT OF PYRODIFENIUM BROMIDE BY INJECTIONS

| Diagnosis | Case Nos. | Effective | Failure | Side effect |
|---|---|---|---|---|
| Gastric and duodenal ulcers | 13 | 13 | 0 | |
| Gastroenteritis and spasm | 15 | 14 | 1 | |
| Cholepathia and cholangia | 26 | 24 | 2 | |
| Pancreatitis | 12 | 8 | 4 | |
| Lithangiuria | 13 | 10 | 3 | |
| Total | 79 | 69 | 10 | |

Pyrodifenium bromide tablet (5 mg.) was used. Usually a daily dose of 3–9 tablets (30 mg.–45 mg.) was given in 3–4 divided portions. In severe abdominal pains, 3–4 tablets were given at one time, with marked antispasmodic effects being recognized (v. Table 7).

TABLE 7.—ANTISPASMODIC EFFECT OF PYRODIFENIUM BROMIDE TABLETS

| Diagnosis | Case Nos. | Effect | Failure | Side effect |
|---|---|---|---|---|
| Gastric ulcers | 12 | 12 | 0 | |
| Duodenal ulcers | 10 | 9 | 1 | |
| Gastroenteritis | 11 | 11 | 0 | |
| Cholepathia and cholangia | 11 | 11 | 0 | |
| Pancreatitis | 4 | 4 | 0 | |
| Lithangiuria | 6 | 6 | 0 | |
| Total | 54 | 53 | 1 | |

(2) Treatment of gastric and duodenal ulcers

Two of Pyrodifenium bromide tablets (5 mg.), were usually given 3 or 4 times daily after meals and/or before retiring. The effect was appraised from its influence on subjective symptoms, gastric fluid, fecal occult blood, X-ray findings, and gastrocamera findings (v. Table 8).

TABLE 8.—TREATMENT OF GASTRIC AND DUODENAL ULCERS

| Diagnosis | Case Nos. | Effective | Failure | Side effect |
|---|---|---|---|---|
| Gastric ulcer | 12 | 12 | 0 | |
| Duodenal ulcer | 10 | 9 | 1 | |

(3) Premedication in cases of endoscopy

As a premedication in cases of endoscopy and X-ray tests of the gastrointestines, 1 ml. ampoule (7.5 mg.) of Pyrodifenium bromide usually was given once intravenously, intramuscularly and subcutaneously. Its moderate effect was found in 60 patients (91%) receiving endoscopic examination and in all 21 patients (100%) receiving X-ray tests of the gastrointestines.

The main indications for Pyrodifenium bromide are as given below.

INDICATIONS (1) As an antispasmodic (spasms of the organs and motility disturbance):
Gastritis, enteritis, cholecystitis, hepatolithiasis, biliary dyskinesia, lithangiura, cystitis, pancreatitis, etc.

(2) As a peptic ulcer remedy:
Gastric ulcer and duodenal ulcer (3) A premedication in cases of examination of digestive tract:
Endoscopy and X-ray test of the gastrointestines.

(IV) COMPOSITION

The Pyrodifenium compound of this invention may be administered to human subjects by any suitable route, e.g. oral, parenteral and rectal routes.

It is advisable to first admix said compound with a suitable pharmaceutically acceptable carrier. Further, for symptoms accompanied by severe spasmodic pains, use of the compound in combination with central nervous system analgesics such as Sulpyrine, Aminopyrine, Pyrabital and the like, may be advantageous.

Compositions administered by oral route may be dispensible powder, pill and granule but most preferable one may be tablet. In the formula of tablets, Prodifenium compound is admixed with the following pharmaceutically acceptable carriers, e.g. diluents (such as potato starch, lactose, spray-dry lactose, calcium phosphate and the like), binders (such as dextrin, potato starch, fine crystalline cellulose, methyl cellulose, gelatin, polyvinylpyrrolidone, sodium carboxymethyl cellulose, polyvinylalcohol and the like), distintegrators (such as potato starch, calcium carboxymethyl cellulose, carboxymethyl cellulose and the like), lubricants (such as magnesium stearate, colloidal silicic acid, talc, polyethyleneglycol, hardened vegetable oil and the like).

Formulas of the tablets are given below:

FORMULA PER TABLET

| Ingredient | (Mg.) | (Mg.) |
|---|---|---|
| Pyrodifenium bromide | 5.0 | 5.0 |
| Sulpyrin | | 250.0 |
| Dextrin | | 4.0 |
| Potato starch | | 15.6 |
| Lactose | | 20.0 |
| Spray-dry lactose | 40.2 | |
| Avicel (trademark) | 25.0 | |
| Methyl cellulose | | 4.0 |
| Magnesium stearate | 0.9 | 3.2 |
| Potassium carboxymethyl cellulose | 8.0 | 15.0 |
| Colloidal silicic acid | 0.9 | 3.2 |
| Total | 80.0 | 320.0 |
| Coated to make | 150.0 | 560.0 |

A preferable composition for parenteral administration may be injectable solution in which the compound of this invention is dissolved in a solvent as distilled water for injection, aqueous propylenglycol (suitably less than 60%), aqueous ethyl alcohol, a mixture of aqueous glycerin (suitably less than 30%) and dilute hydrochloric acid, and the like. For the purpose of preparing an isotonic solution, it is preferable to add such a substance as sodium chloride, sodium nitrate, potassium nitrate and the like. However, in the form of an injectable solution of Pyrodifenium compound of this invention combining central analgesics, the solution becomes hypertonic owing to dissolution of active ingredients. For such injectable solution, colored light-resistant ampoules should be used. It is also preferable that air in the ampules is substituted by such non-oxidizable gas as nitrogen, argon, etc., thereby coloration and reduction in contents of the solution can be prevented.

Formulas of the injectable solutions are given below:

FORMULA PER AMPOULE

| Ingredient | Example 1 (mg.) | Example 2 (mg.) |
|---|---|---|
| Pyrodifenium bromide | 7.5 | 7.5 |
| Sulpyrin | | 1,000 |
| Sodium chloride | 9.0 | |
| Distilled water for injection | To make 1 cc. | To make 5 cc. |
| pH | 5.0–7.5 | 5.0–8.5 |
| Gas substituted | N₂ | N₂ |
| Ampoule | White | Brown |

A preferable composition for rectal administration may be suppository, for which bases are exemplified with cacao butter, glycerogelatin, polyvinylalcohol, vegetable hardened oil and the like.

Formulas of the suppositories are as follows:

FORMULA PER SUPPOSITORY

| Ingredient | Example 1 (mg.) | Example 2 (mg.) |
|---|---|---|
| Pyrodifenium bromide | 7.5 | 7.5 |
| Sulpyrin | | 400 |
| Witepsol E75 (trademark) | 696.25 | 496.25 |
| Witepsol H12 (trademark) | 696.25 | 496.25 |

What is claimed is:

1. A dosage unit composition for treating spasms of smooth muscle and peptic ulcer in mammals comprising about 1 to 30 mg. of 1,1-diethyl-2-methyl-3-diphenylmethylenepyrrolidinium bromide and a pharmaceutically acceptable carrier.

2. A dosage unit composition in accordance with claim 1 in which the quantity of 1,1-diethyl-2-methyl-3-diphenylmethylenepyrrolidinium bromide is 5 to 15 mg.

3. A dosage unit composition in accordance with claim 1 in which the composition contains a central nervous system analgesic.

4. A method of treating spasms of smooth muscle organs and peptic ulcers in mammals, which comprises administering to a mammal a daily dose of 3 to 90 mg. of 1,1-diethyl-2-methyl-3-diphenylmethylenepyrrolidinium bromide.

5. A method of treating spasms of smooth muscle organs and peptic ulcers in mammals in accordance with claim 4 in which the daily dose of 1,1-diethyl-2-methyl-3-diphenylmethylenepyrrolidinium bromide is 15 to 45 mg.

6. A method of treating spasms of smooth muscle organs and peptic ulcers in mammals in accordance with claim 4 in which there is also simultaneously administered a central nervous system analgesic.

7. A method of blocking parasympathetic ganglia in mammals which comprises administering to a mammal a daily dose of 3 to 90 mg. of 1,1-diethyl-2-methyl-3-diphenylmethylenepyrrolidinium bromide.

References Cited

UNITED STATES PATENTS

| | | | |
|---|---|---|---|
| 2,832,717 | 4/1958 | Ferguson | 167—55 |
| 2,918,406 | 12/1959 | Biel | 167—55 |
| 3,155,576 | 11/1964 | Lish | 167—55 |

ALBERT T. MEYERS, Primary Examiner

D. M. STEPHENS, Assistant Examiner